United States Patent
Chiang

(10) Patent No.: US 6,810,825 B2
(45) Date of Patent: Nov. 2, 2004

(54) WOOD PLANING MACHINE WITH A SHIELD MEMBER FOR A MOTOR UNIT AND A CUTTER MEMBER

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 89 days.

(21) Appl. No.: 10/384,215

(22) Filed: Mar. 7, 2003

(65) Prior Publication Data

US 2004/0112464 A1 Jun. 17, 2004

(30) Foreign Application Priority Data

Dec. 13, 2002 (TW) ........................................ 91220321 A

(51) Int. Cl.$^7$ ................................................. B27C 1/10
(52) U.S. Cl. .................... 114/129; 144/130; 144/117.1; 144/121; 408/241 G; 74/609
(58) Field of Search ............................ 144/114.1, 116, 144/118, 117.1–117.4, 128–131, 121, 123, 252.1, 371; 74/608, 609; 408/67, 234, 241 G; 409/134, 137

(56) References Cited

U.S. PATENT DOCUMENTS

| | | | | | |
|---|---|---|---|---|---|
| 3,718,168 | A | * | 2/1973 | Berends | 144/117.1 |
| 3,913,642 | A | * | 10/1975 | Porter | 144/114.1 |
| 4,485,859 | A | * | 12/1984 | Krogstad et al. | 144/252.1 |
| 5,517,879 | A | * | 5/1996 | Narvaez | 74/609 |
| 6,269,853 | B1 | * | 8/2001 | Chang | 144/117.1 |
| 6,315,014 | B1 | * | 11/2001 | Chang | 144/117.1 |

* cited by examiner

Primary Examiner—Allen Ostrager
Assistant Examiner—Shelley Self
(74) Attorney, Agent, or Firm—Brinks Hofer Gilson & Lione

(57) ABSTRACT

A wood planing machine includes a support carriage mounted movably on a mounting frame, a motor unit and a cutter member mounted on the support carriage, and a shield member mounted on the support carriage and pivotable between covering and uncovering positions. When the shield member is disposed at the covering position, a motor shielding portion of the shield member is disposed to cover an upper housing part of the motor unit, whereas a cutter shielding portion, which extends from the motor shielding portion, is disposed to shield a top side of the cutter member.

13 Claims, 9 Drawing Sheets

WOOD PLANING MACHINE WITH A SHIELD MEMBER FOR A MOTOR UNIT AND A CUTTER MEMBER

CROSS-REFERENCE TO RELATED APPLICATION

This application claims priority of Taiwanese application no. 091220321, filed on Dec. 13, 2002.

BACKGROUND OF THE INVENTION

1. Field of the Invention

The invention relates to a wood planing machine, more particularly to a wood planing machine with a shield member for a motor unit and a cutter member.

2. Description of the Related Art

In co-pending U.S. patent application Ser. No. 10/155,617, filed on May 24, 2002, there is disclosed a wood planing machine that includes a support carriage mounted movably on a mounting frame for supporting a cutting shaft. A motor housing and a shaving collecting member are mounted on the support carriage. The shaving collecting member confines a shaving passage in the vicinity of the cutting shaft and in fluid communication with an air conduit such that an air stream introduced from the motor housing can entrain wood shavings collected in the shaving collecting member. A blower mechanism includes a drive shaft coupled to and driven by the cutting shaft for rotating an impeller so as to draw wood shavings from the shaving collecting member into the blower mechanism and out of a discharge member.

In the aforesaid wood planing machine, the shaving collecting member is configured to shield only a top side of the cutting shaft. Accordingly, the motor housing is uncovered, which exposes operators to a high risk of getting burned due to accidental contact with the motor housing during operation of the wood planing machine.

SUMMARY OF THE INVENTION

Therefore, the object of the present invention is to provide a wood planing machine with a shield member for a motor unit and a cutter member so as to overcome the aforesaid drawback.

Accordingly, the wood planing machine of this invention comprises:

a mounting frame having upper and lower ends opposite to each other in an upright direction;

a support carriage mounted on the mounting frame and movable between the upper and lower ends in the upright direction, the support carriage having left and right sides spaced apart from each other in a longitudinal direction transverse to the upright direction, and front and rear sides spaced apart from each other in a transverse direction relative to the longitudinal and upright directions;

a motor unit operable so as to deliver a driving force and having a motor housing mounted on the support carriage, the motor housing having an upper housing part that projects upwardly relative to the support carriage, the upper housing part including a rear wall proximate to the rear side, and a front wall opposite to the rear wall in the transverse direction;

a cutter member mounted on the support carriage, located between the motor housing and the front side, and coupled to and driven by the motor unit, the cutter member having a top side; and a shield member mounted on the support carriage and pivotable between covering and uncovering positions, the shield member having a motor shielding portion that is configured to cover the upper housing part of the motor housing when the shield member is disposed at the covering position, and a cutter shielding portion that extends from the motor shielding portion and that is configured to shield the top side of the cutter member when the shield member is disposed at the covering position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
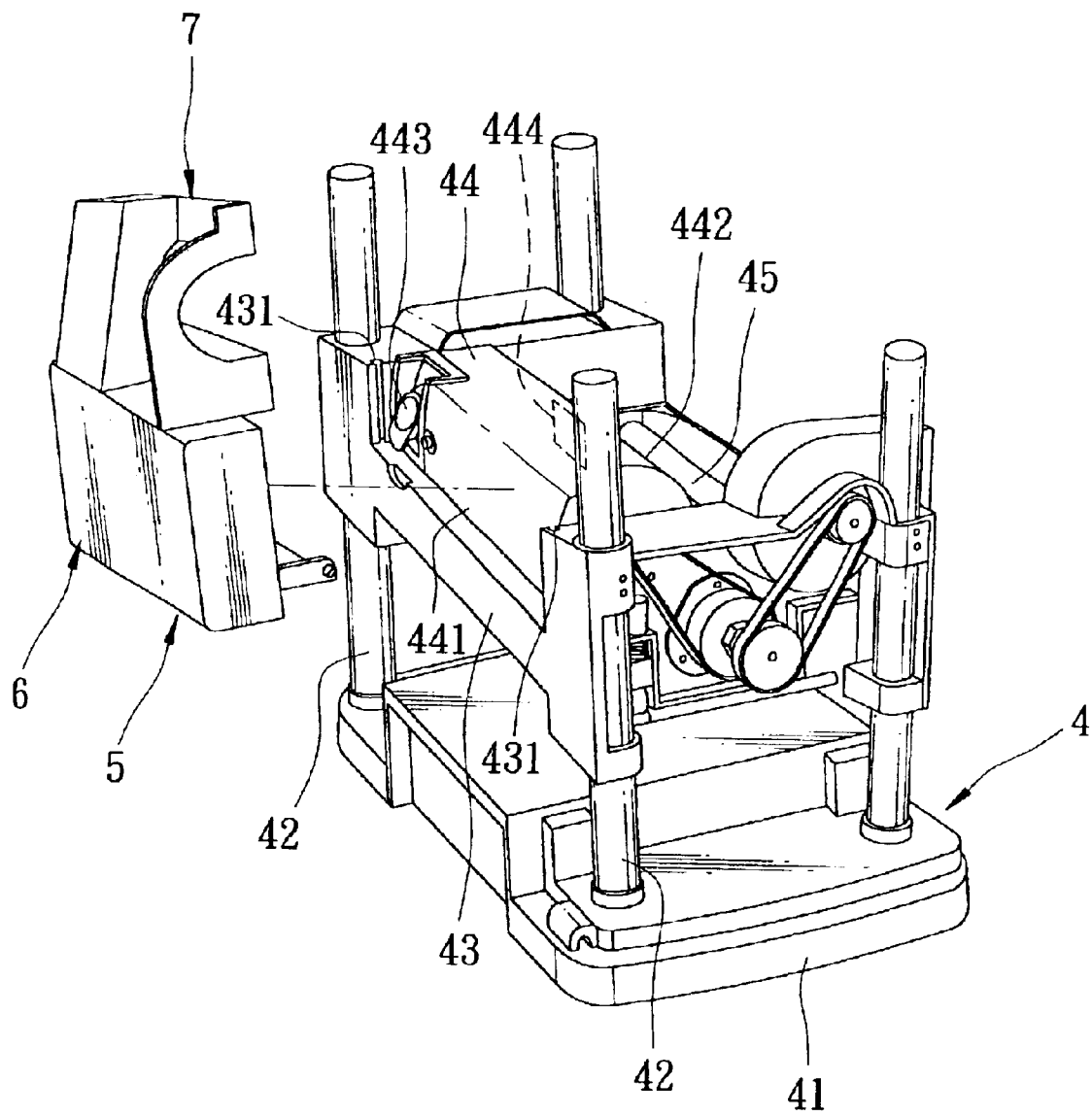
FIG. 1 is a partly exploded, perspective view showing the preferred embodiment of a wood planing machine according to the present invention.
Figure 2:
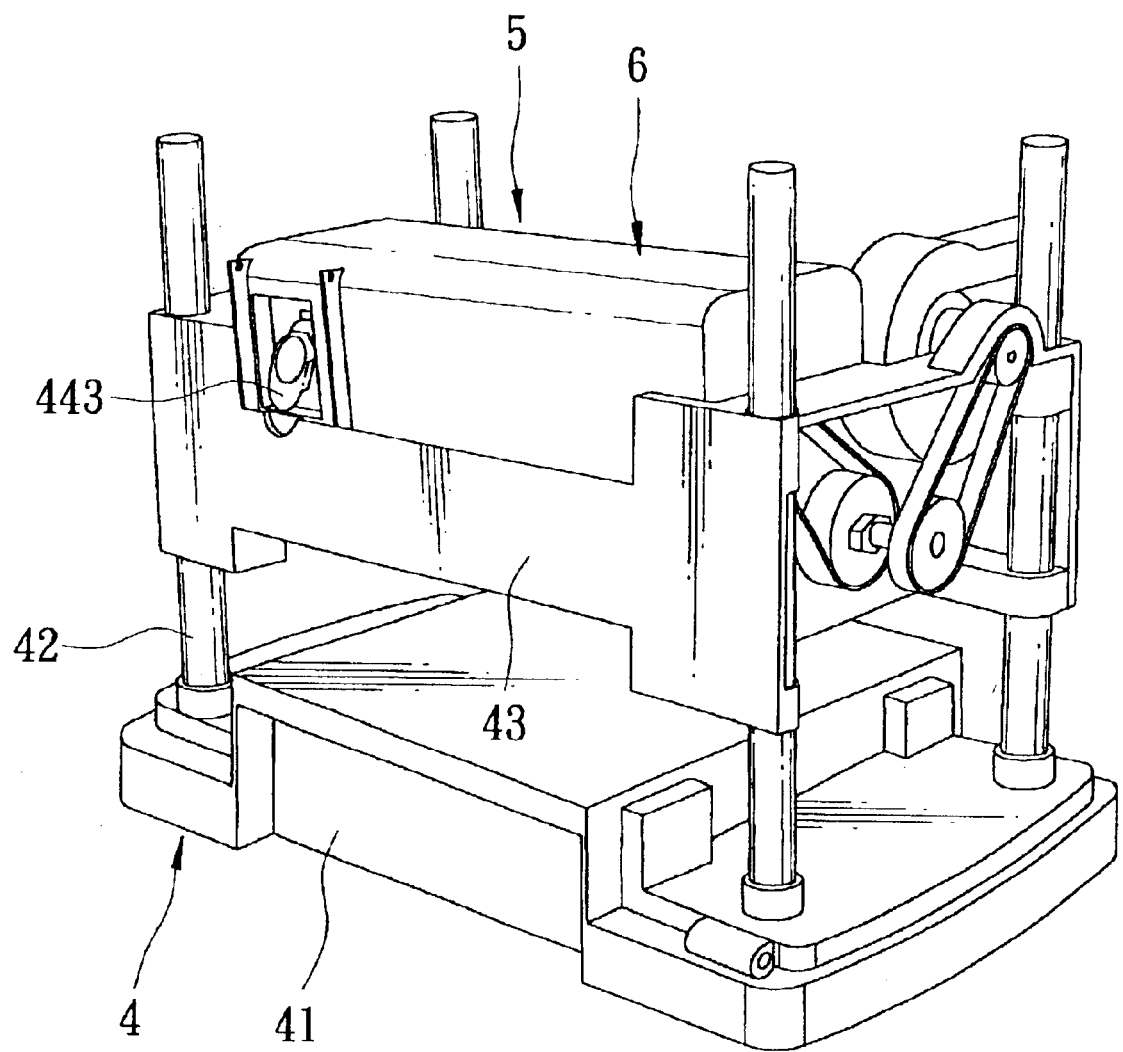
FIG. 2 is a rear perspective view of the preferred embodiment.
Figure 3:
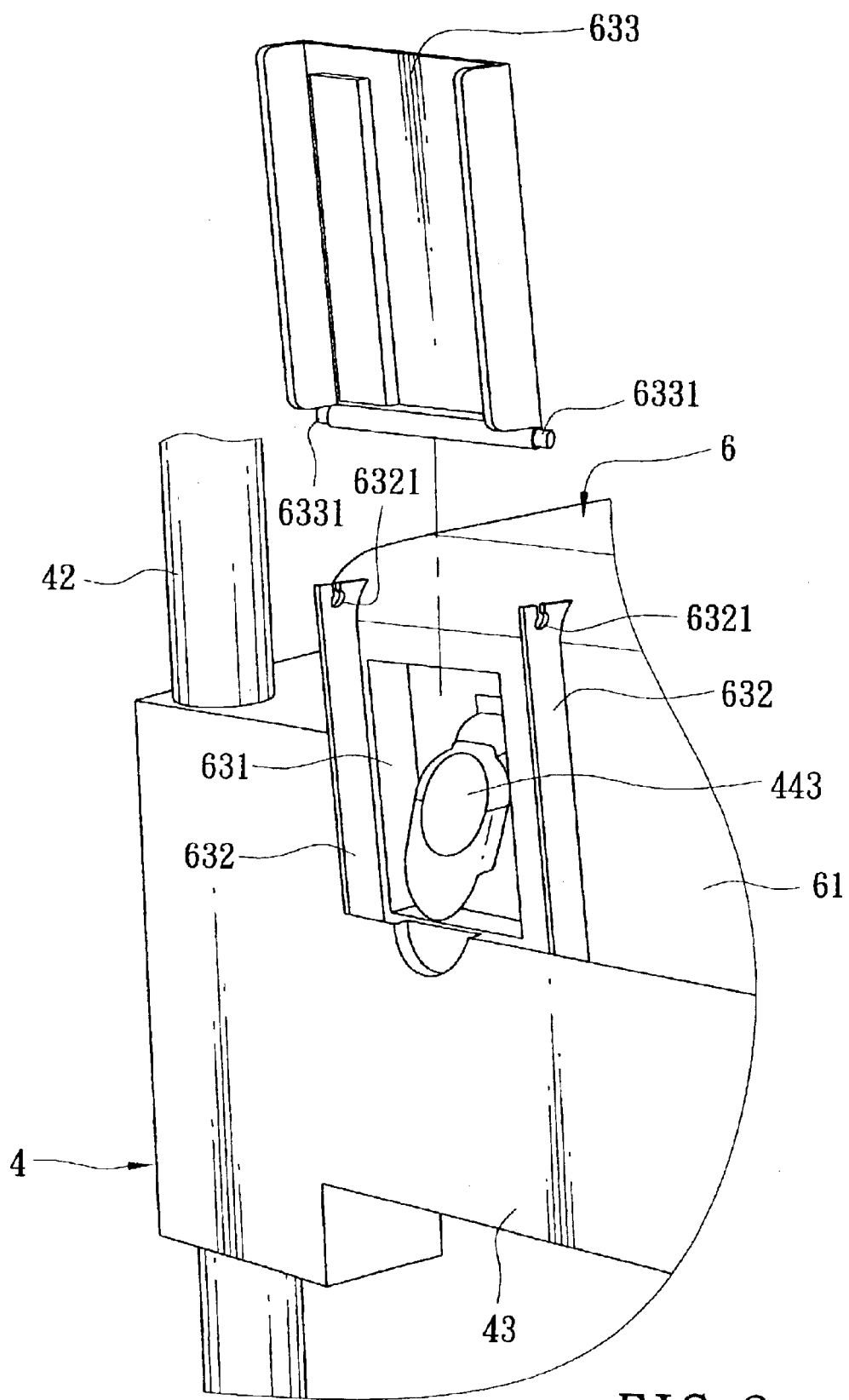
FIG. 3 is a fragmentary, partly exploded, perspective view showing a motor shielding portion of a shield member of the preferred embodiment.
Figure 4:
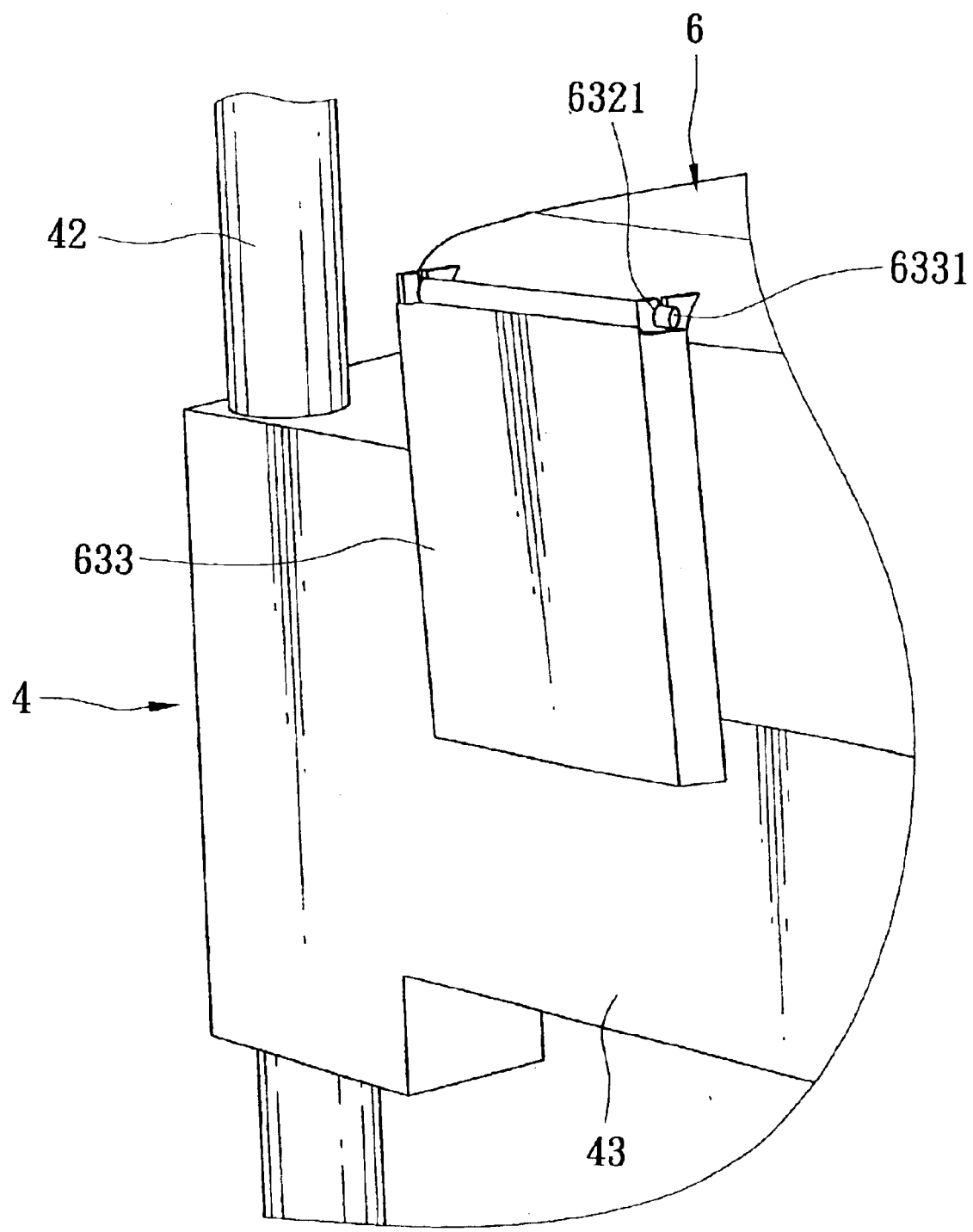
FIG. 4 is a fragmentary perspective view of the motor shielding portion, illustrating a switch cover when covering a switch access hole.

Referring to FIGS. 1 and 2, the preferred embodiment of a wood planing machine 4 according to the present invention is shown to include amounting frame, a support carriage 43, a motor unit 44, and a cutter member 45.

The mounting frame has upper and lower ends opposite to each other in an upright direction, and includes a base 41 and four support rods 42 which extend in the upright direction from the base 41.

The support carriage 43 is mounted on the support rods 42 and is movable between the upper and lower ends of the mounting frame in the upright direction in a conventional manner. The support carriage 43 has left and right sides spaced apart from each other in a longitudinal direction transverse to the upright direction, and front and rear sides spaced apart from each other in a transverse direction relative to the longitudinal and upright directions.

The motor unit 44 is operable so as to deliver a driving force, and has a motor housing mounted on the support carriage 43. The motor housing has an upper housing part that projects upwardly relative to the support carriage 43. The upper housing part includes a rear wall 441 proximate to the rear side of the support carriage 43, and a front wall 442 opposite to the rear wall 441 in the transverse direction.

The cutter member 45 is mounted on the support carriage 43, is located between the motor housing of the motor unit 44 and the front side of the support carriage 43, and is coupled to and driven by the motor unit 44. Since the coupling arrangement between the cutter member 45 and the motor unit 44 is known in the art, a detailed description of the same is dispensed with herein for the sake of brevity.

Figure 8:
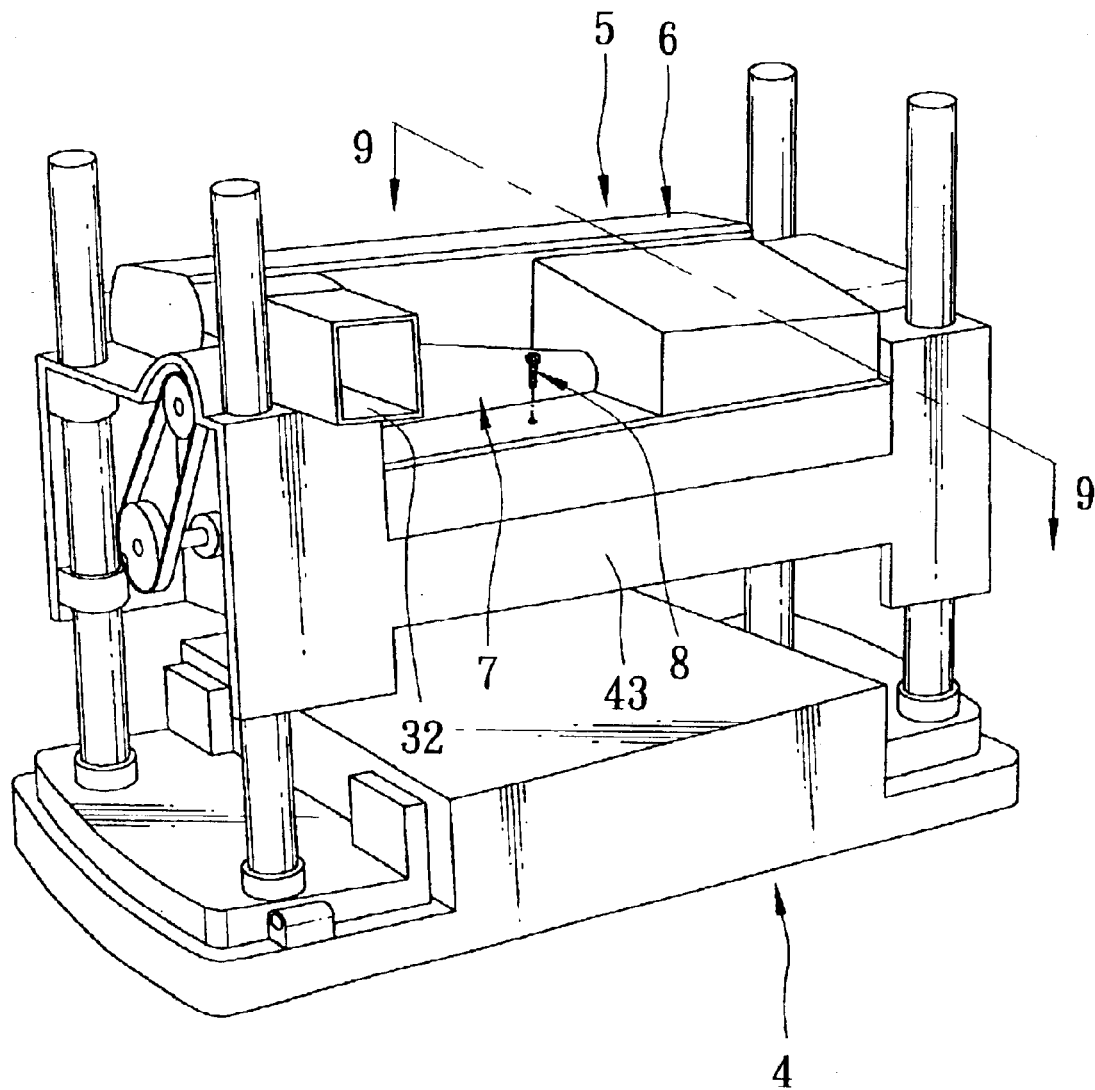
FIG. 8 is another perspective view of the preferred embodiment, illustrating the shield member when disposed in a covering position.
Figure 9:
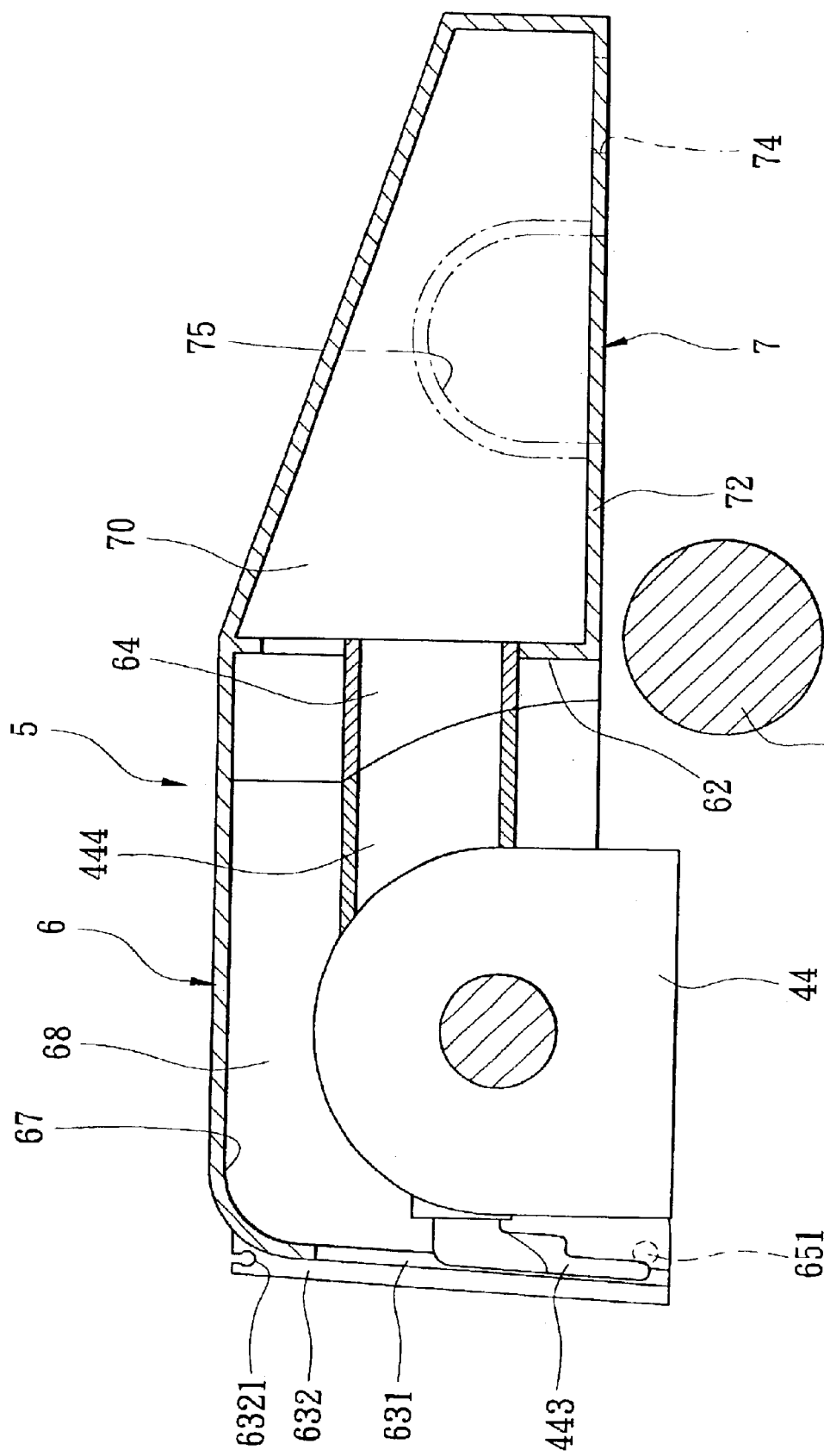
FIG. 9 is a sectional view of the preferred embodiment, taken along line 9—9 in FIG. 8.

In the wood planing machine of this invention, a shield member 5 is mounted on the support carriage 43 and is pivotable between covering and uncovering positions. The shield member 5 includes a motor shielding portion 6 that is configured to cover the upper housing part of the motor housing of the motor unit 44 when the shield member 5 is disposed at the covering position (see FIGS. 2 and 8), and a cutter shielding portion 7 that extends from the motor shielding portion 6 and that is configured to shield a top side of the cutter member 45 when the shield member 5 is disposed at the covering position (see FIGS. 2 and 8).

Figure 5:
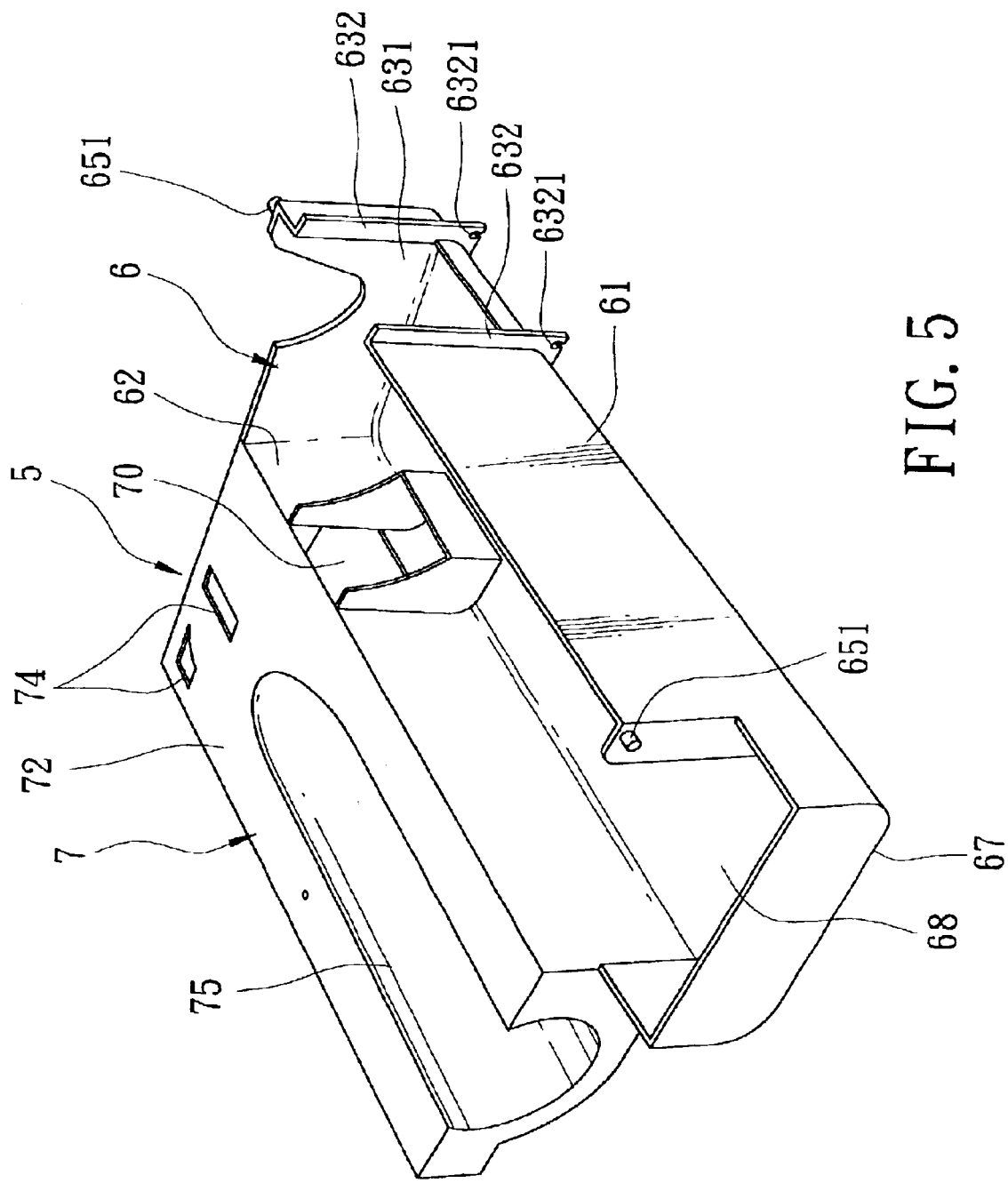
FIG. 5 is an inverted perspective view of the shield member of the preferred embodiment.
Figure 6:
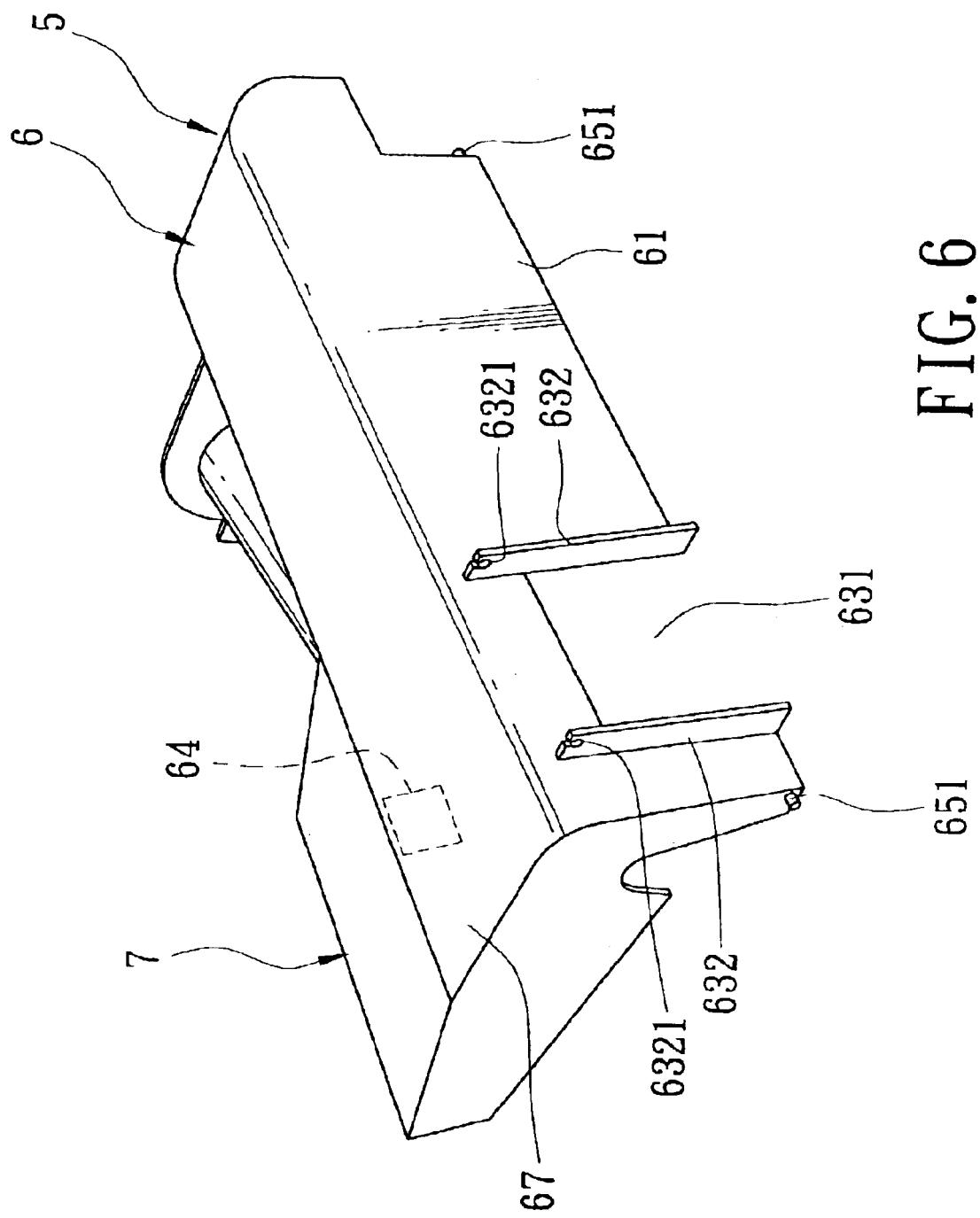
FIG. 6 is a rear perspective view of the shield member.
Figure 7:
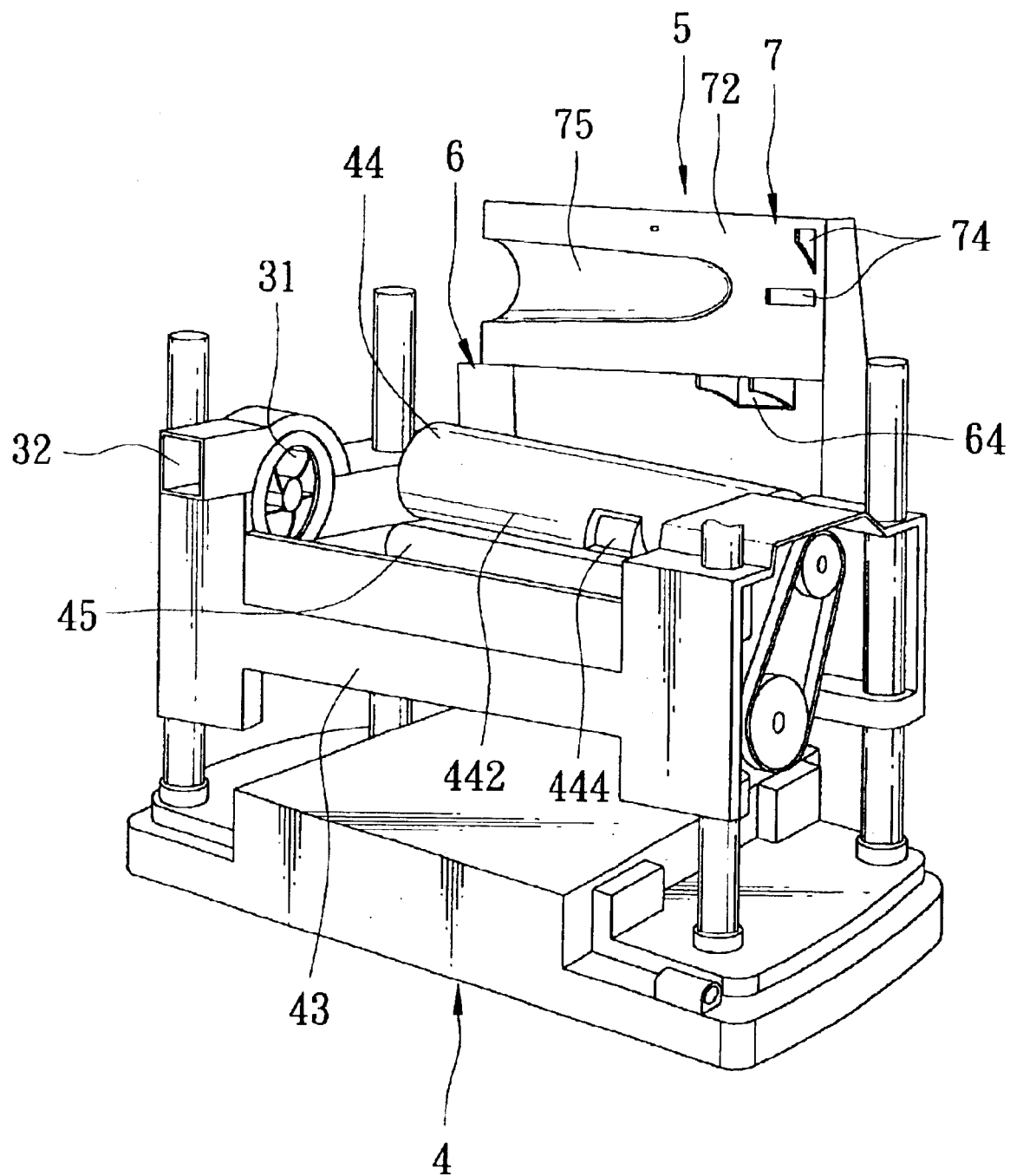
FIG. 7 is a perspective view of the preferred embodiment, illustrating the shield member when disposed in an uncovering position.

Referring to FIGS. 1 and 5, each of the left and right sides of the support carriage 43 has a top surface and an inner upright surface facing the other of the left and right sides of the support carriage 43 and formed with an elongate slide groove 431. The slide groove 431 extends in the upright direction from the top surface, and is disposed proximate to the rear side of the support carriage 43. The motor shielding portion 6 includes a rear plate 61 disposed to confront the rear wall 441 of the upper housing part of the motor housing of the motor unit 44. The rear plate 61 has a pair of opposite lateral edges. Each of the opposite lateral edges is formed with a pivot rod 651 that extends slidably into the slide groove 431 in an adjacent one of the left and right sides of the support carriage 43 to permit pivoting movement of the shield member 5 between the covering and uncovering positions.

Referring to FIGS. 1 to 4, the motor unit 44 further includes a motor switch 443 mounted on the rear wall 441 of the upper housing part of the motor housing. The rear plate 61 of the motor shielding portion 6 is formed with a switch access hole 631 that is registered with the motor switch 443 when the shield member 5 is disposed at the covering position. The switch access hole 631 is generally rectangular and has a pair of lateral edges. Moreover, the rear plate 61 is formed with a pair of mounting flanges 632 that extend respectively and rearwardly from the lateral edges. Each of the mounting flanges 632 has a top edge formed with an engaging groove 6321. The motor shielding portion 6 further includes a switch cover 633 that is provided with a pair of engaging studs 6331. The engaging studs 6331 engage respectively the engaging grooves 6321 in the mounting flanges 632 to mount pivotally the switch cover 633 on the mounting flanges 632 of the rear plate 61 for covering and uncovering the switch access hole 631.

The front wall 442 of the upper housing part of the motor unit 44 is formed with a vent port 444 that is disposed proximate to the right side of the support carriage 43. The motor, shielding portion 6 further includes a front plate 62 that is disposed to confront the front wall 442 of the upper housing part and that is formed with an air duct 64. The front and rear plates 62, 61, together with a top plate 67 of the motor shielding portion 6, define a motor receiving space 68 of the motor shielding portion 6. The air duct 64 is registered with the vent port 444 when the shield member 5 is disposed at the covering position. With further reference to FIGS. 6 to 9, the cutter shielding portion 7 has a hollow interior 70, and includes a bottom plate 72 that is formed with a vent hole set 74 proximate to the right side of the support carriage 43. The air duct 64 is in fluid communication with the hollow interior 70 of the cutter shielding portion 7. Preferably, a screw fastener 8 (see FIG. 8) is used to fasten the bottom plate 72 to the support carriage 43 so that the shield member 5 can be secured releasably at the covering position.

The wood planing machine 4 of this embodiment further includes a fan mechanism 31 mounted on the left side of the support carriage 43 and disposed proximate to the front side of the support carriage 43. The fan mechanism 31 is similar to that installed in the wood planing machine of the aforesaid co-pending U.S. patent application, and is driven to rotate together with the cutter member 45 by virtue of the driving force from the motor unit 44. The bottom plate 72 of the cutter shielding portion 7 is further formed with a shavings guide groove 75 that extends in the longitudinal direction and that is registered with the fan mechanism 31 when the shield member 5 is disposed at the covering position.

In use, when the shield member 5 is disposed at the covering position, air discharged at the vent port 444 during operation of the motor unit 44 is led into the hollow interior 70 of the cutter shielding portion 7 through the air duct 64 and is vented through the vent hole set 74 so as to cooperate with air currents generated by the fan mechanism 31 such that wood shavings generated during operation of the cutter member 45 can be guided to the fan mechanism 31 through the shavings guide groove 75 for subsequent discharge to a collecting bag (not shown) that is connected to a shavings discharge tube 32 in a manner similar to that in the aforesaid co-pending U.S. patent application.

In summary, the covering function provided by the shield member 5 shields both the motor unit 44 and the cutter member 45 so as to minimize scattering of wood shavings that are generated during a cutting operation and so as to result in a safer working environment since accidental contact by the operator with either the motor unit 44 or the cutter member 45 can be avoided.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A wood planing machine comprising:
    a mounting frame having upper and lower ends opposite to each other in an upright direction;
    a support carriage mounted on said mounting frame and movable between said upper and lower ends in the upright direction, said support carriage having left and right sides spaced apart from each other in a longitudinal direction transverse to the upright direction, and front and rear sides spaced apart from each other in a transverse direction relative to the longitudinal and upright directions;
    a motor unit operable so as to deliver a driving force and having a motor housing mounted on said support carriage, said motor housing having an upper housing part that projects upwardly relative to said support carriage, said upper housing part including a rear wall proximate to said rear side, and a front wall opposite to said rear wall in the transverse direction;
    a cutter member mounted on said support carriage, located between said motor housing and said front side, and coupled to and driven by said motor unit, said cutter member having a top side; and a shield member mounted on said support carriage and pivotable between covering and uncovering positions, said shield member having a motor shielding portion that is configured to cover said upper housing part of said motor housing when said shield member is disposed at the covering position, and a cutter shielding portion that extends from said motor shielding portion and that is configured to shield said top side of said cutter member when said shield member is disposed at the covering position.

2. The wood planing machine as claimed in claim 1, wherein each of said left and right sides of said support carriage has a top surface and an inner upright surface facing the other of said left and right sides of said support carriage and formed with an elongate slide groove, said slide groove extending in the upright direction from said top surface and being disposed proximate to said rear side of said support carriage, said motor shielding portion including a rear plate disposed to confront said rear wall of said upper housing part, said rear plate having a pair of opposite lateral edges, each of which is formed with a pivot rod that extends slidably into said slide groove in an adjacent one of said left and right sides of said support carriage to permit pivoting movement of said shield member between the covering and uncovering positions.

3. The wood planing machine as claimed in claim 1, wherein said motor unit includes a motor switch mounted on said rear wall, said motor shielding portion including a rear plate that is disposed to confront said rear wall of said upper housing part, said rear plate being formed with a switch access hole that is registered with said motor switch when said shield member is disposed at the covering position, said motor shielding portion further including a switch cover mounted movably on said rear plate for covering and uncovering said switch access hole.

4. The wood planing machine as claimed in claim 3, wherein said switch access hole is generally rectangular and has a pair of lateral edges, said rear plate being formed with a pair of mounting flanges that extend respectively and rearwardly from said lateral edges, said switch cover being mounted pivotally on said mounting flanges.

5. The wood planing machine as claimed in claim 4, wherein each of said mounting flanges has a top edge formed with an engaging groove, said switch cover being provided with a pair of engaging studs that engage respectively said engaging grooves in said mounting flanges to mount pivotally said switch cover on said mounting flanges.

6. A wood planing machine comprising:

a mounting frame having upper and lower ends opposite to each other in an upright direction;

a support carriage mounted on said mounting frame and movable between said upper and lower ends in the upright direction, said support carriage having left and right sides spaced apart from each other in a longitudinal direction transverse to the upright direction, and front and rear sides spaced apart from each other in a transverse direction relative to the longitudinal and upright directions;

a motor unit operable so as to deliver a driving force and having a motor housing mounted on said support carriage, said motor housing having an upper housing part that projects upwardly relative to said support carriage, said upper housing part including a rear wall proximate to said rear side, and a front wall opposite to said rear wall in the transverse direction, said front wall being formed with a vent port that is disposed proximate to said right side;

a cutter member mounted on said support carriage, located between said motor housing and said front side, and coupled to and driven by said motor unit, said cutter member having a top side; and a shield member mounted on said support carriage and pivotable between covering and uncovering positions, said shield member having a motor shielding portion that is configured to cover said upper housing part of said motor housing when said shield member is disposed at the covering position, and a cutter shielding portion that extends from said motor shielding portion and that is configured to shield said top side of said cutter member when said shield member is disposed at the covering position;

wherein said cutter shielding portion has a hollow interior and is formed with a vent hole set, said motor shielding portion including a front plate that is disposed to confront said front wall of said upper housing part and that is formed with an air duct, said air duct being in fluid communication with said hollow interior of said cutter shielding portion and being registered with said vent port when said shield member is disposed at the covering position.

7. The wood planing machine as claimed in claim 6, further comprising a fan mechanism mounted on said left side and disposed proximate to said front side, said cutter shielding portion including a bottom plate, said vent hole set being formed in said bottom plate proximate to said right side, said bottom plate being further formed with a shavings guide groove that extends in the longitudinal direction and that is registered with said fan mechanism when said shield member is disposed at the covering position, wherein, when said shield member is disposed at the covering position, air discharged at said vent port during operation of said motor unit is led into said hollow interior of said cutter shielding portion through said air duct and is vented through said vent hole set so as to cooperate with air currents generated by said fan mechanism such that wood shavings generated during operation of said cutter member can be guided to said fan mechanism through said shavings guide groove for subsequent discharge.

8. A shield member for a wood planing machine, the wood planing machine including a mounting frame having upper and lower ends opposite to each other in an upright direction, a support carriage mounted on the mounting frame and movable between the upper and lower ends in the upright direction, the support carriage having left and right sides spaced apart from each other in a longitudinal direction transverse to the upright direction, and front and rear sides spaced apart from each other in a transverse direction relative to the longitudinal and upright directions, a motor unit operable so as to deliver a driving force and having a motor housing mounted on the support carriage, the motor housing having an upper housing part that projects upwardly relative to the support carriage, the upper housing part including a rear wall proximate to the rear side, and a front wall opposite to the rear wall in the transverse direction, and a cutter member mounted on the support carriage, located between the motor housing and the front side, and coupled to and driven by the motor unit, the cutter member having a top side, said shield member being adapted to be mounted on the support carriage so as to be movable between covering and uncovering positions, and comprising:

a motor shielding portion that is configured to cover the upper housing part of the motor housing when said shield member is disposed at the covering position;

a cutter shielding portion that extends from said motor shielding portion and that is configured to shield the top side of the cutter member when said shield member is disposed at the covering position; and pivot means adapted for mounting pivotally said motor shielding portion on the support carriage so as to permit movement of said shield member between the covering and uncovering positions.

9. The shield member as claimed in claim 8, the motor unit including a motor switch mounted on the rear wall, wherein said motor shielding portion includes a rear plate that is disposed to confront the rear wall of the upper housing part, said rear plate being formed with a switch access hole that is registered with the motor switch when said shield member is disposed at the covering position, said motor shielding portion further including a switch cover mounted movably on said rear plate for covering and uncovering said switch access hole.

10. The shield member as claimed in claim 9, wherein said switch access hole is generally rectangular and has a pair of lateral edges, said rear plate being formed with a pair of mounting flanges that extend respectively and rearwardly from said lateral edges, said switch cover being mounted pivotally on said mounting flanges.

11. The shield member as claimed in claim 10, wherein each of said mounting flanges has a top edge formed with an engaging groove, said switch cover being provided with a pair of engaging studs that engage respectively said engaging grooves in said mounting flanges to mount pivotally said switch cover on said mounting flanges.

12. The shield member as claimed in claim 8, the front wall being formed with a vent port that is disposed proximate to the right side, wherein said cutter shielding portion has a hollow interior and is formed with a vent hole set, said motor shielding portion including a front plate that is disposed to confront the front wall of the upper housing part and that is formed with an air duct, said air duct being in fluid communication with said hollow interior of said cutter shielding portion and being registered with the vent port when said shield member is disposed at the covering position.

13. The shield member as claimed in claim 12, the wood planing machine further including a fan mechanism mounted on the left side and disposed proximate to the front side, wherein said cutter shielding portion includes a bottom plate, said vent hole set being formed in said bottom plate proximate to said right side, said bottom plate being further formed with a shavings guide groove that extends in the longitudinal direction and that is registered with the fan mechanism when said shield member is disposed at the covering position, wherein, when said shield member is disposed at the covering position, air discharged at the vent port during operation of the motor unit is led into said hollow interior of said cutter shielding portion through said air duct and is vented through said vent hole set so as to cooperate with air currents generated by the fan mechanism such that wood shavings generated during operation of the cutter member can be guided to the fan mechanism through said shavings guide groove for subsequent discharge.

* * * * *